United States Patent Office 3,433,537
Patented Mar. 18, 1969

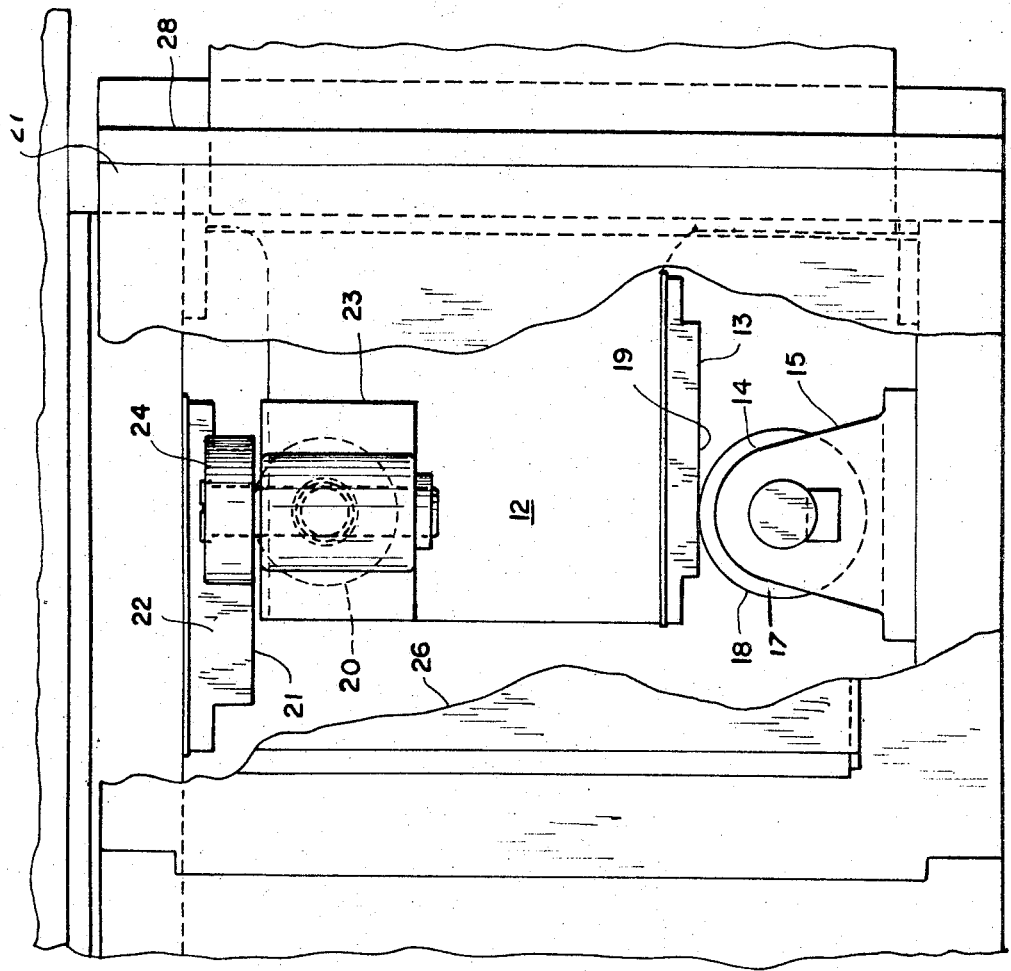
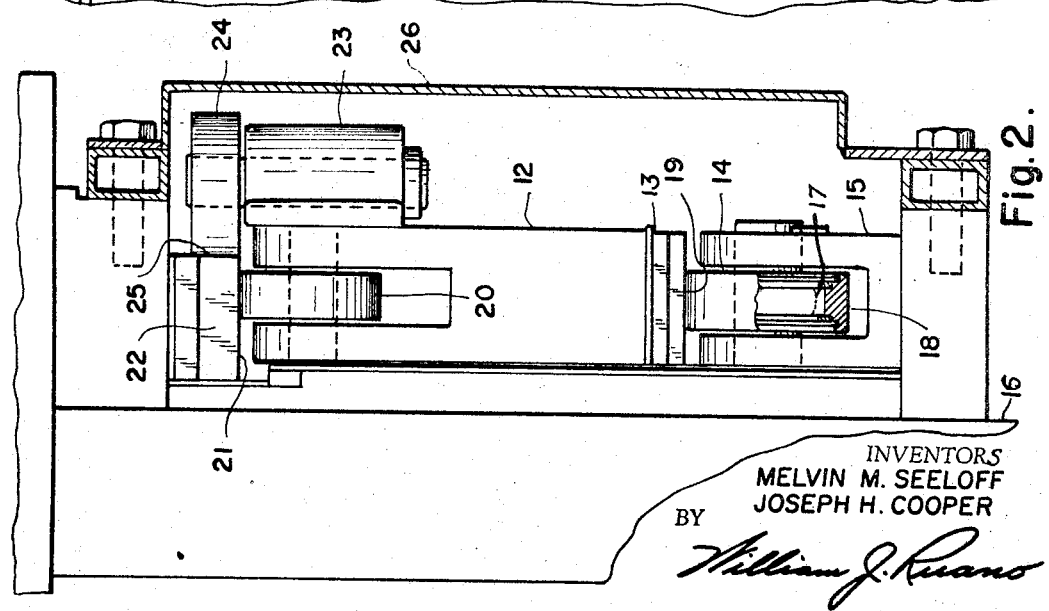

3,433,537
PARTICLE-FREE BEARING ASSEMBLY
Melvin M. Seeloff and Joseph H. Cooper, Warren, Ohio, assignors to The Taylor-Winfield Corporation, Warren, Ohio
Filed Mar. 22, 1967, Ser. No. 625,089
U.S. Cl. 308—6                            5 Claims
Int. Cl. F16c 17/00, 21/00, 19/00

ABSTRACT OF THE DISCLOSURE

Broadly stated, this invention relates to a roller bearing construction especially suitable for a large, dirt generating machine, such as an electric resistance flash-butt welder, which roller bearing construction is used on the four corners of a large slide assembly and is devoid of any slide surfaces which point upwardly on which dirt particles could settle by gravity and result in malfunction when a roller rolls thereon. Instead, the slide surfaces are all vertical and horizontal, but the horizontal (or angular) being on the underside of a machine part or slide element.

---

This invention relates, generally, to the bearing ways of reciprocating members and, more particularly, to said members when massive in size, such as when used on electric resistance flash-butt welders or the like.

After a thorough and careful study, we find that there are four paramount requisites of all slide type of bearing ways, regardless of size, which are as follows:

(1) The slides must be closely fitted for accuracy, but not too tightly since this may cause binding with a high resultant coefficient of friction. If too loosely fitted, the accuracy of the slide is impaired.

(2) The materials and components of the slide must be such that the coefficient of friction is kept to a minimum.

(3) The slide elements must be kept free from weld flash, scale and similar abrasive dirt to prevent galling, which greatly increases friction and causes malfunctioning of the machine.

(4) The slide must be economical to build.

These paramount requisites will be further described hereinafter in the order as enumerated above.

In a conventional type of rectangular slide incorporating gibs and the like, all surfaces must be flat and parallel in order to obtain sufficient bearing areas to keep the bearing pressure per square inch within safe limits of the materials selected and of the lubricating medium. To achieve flatness and parallelism of the bearing surfaces entails a considerable amount of accurate machine work plus considerable handwork, such as scraping, honing, etc. This is particularly true where the bearing areas are widely dispersed as is common on electric welding machines, especially those that are massive in size and weight, such as strip flash-butt welders.

The greater the dimension between the bearings, the greater the difficulty will be to keep the bearings flat and parallel to obtain the required intimate contact. The distance between bearings on the large flash welders, for example, is approximately 12 feet and could be greater.

In a typical conventional construction wherein bearing areas are provided on the four corners of a large flash welder slide, such as shown in Patent No. 3,249,732, each of the four bearing areas includes a rectangular slide member and flat wear strips fastened to the top, bottom and one side, thereof which engage and slide on mating wear strips fastened to the stationary part of the machine.

To withstand the pressures imposed upon the three sliding surfaces of each bearing area or corner, it is essential that these surfaces be absolutely flat and parallel. With the buildup of all the machining tolerances of the individual pieces making up the slide and the stationary part of the machine, it can be readily seen that it would be most difficult to achieve a final result so that the three sliding surfaces are flat, parallel and in intimate contact simultaneously on all four corners of the machine. Considerable handwork such as scraping, honing or undesirable shimming has to be done on each bearing to achieve the desired result.

Since it is virtually impossible to get a perfectly intimate bearing contact at these three surfaces, the wear strips are necessarily made oversize to allow for a certain amount of misfit but still have enough contact to carry the imposed load.

It is also essential that the wear strip materials be chosen so they are compatible at the wearing surface and allow movement between the sliding surfaces with the lowest possible coefficient of friction. In most cases the sliding surfaces must be frequently lubricated to prevent galling of the sliding surfaces. The lubrication means is usually expensive, messy and necessitates frequent, diligent maintenance.

Of utmost importance is the fact that sliding surfaces must be kept free of all weld flash, scale and other dirt which will increase the coefficient of friction and increase the tendency toward galling of the sliding surfaces. The sliding surfaces, wetted by the lubrication, should not be exposed to dirty conditions since the particles of weld flash and dirt will stick to the wetted surfaces. The wetter surfaces can be, and usually are, guarded against weld flash and dirt contamination, but the guarding means is usually quite expensive and seldom completely effective. Dirt will creep into the bearings under the best of guarding conditions. This is especially true on resistance flash welders where the nature of the operation is extremely dirty with much expelled abrasive "flash" material. Unfortunately, there is always at least one sliding surface which is horizontal and on which the roller rolls, therefore such surface will collect dirt, from the welding operation, by settling thereon by gravity. The dirt therefore tends to adhere to the horizontal sliding surface.

It is readily seen from the above descriptions that to manufacture the conventional sliding type bearings, which type is used on most large resistance flash welders, is expensive. In addition, they must be constantly maintained and lubricated.

It is common practice to level the base of a machine before assembling and fitting the bearing ways. This is especially true when fitting slide bearings of the conventional type, particularly the widely dispersed bearings typically used on resistance flash welders. Only when the machine is in the level position will the bearings function properly.

All manufacturers take every precaution to inform the ultimate users as to the necessity of releveling the machine at the time of its installation. In spite of all this initial leveling, unforeseen events, such as the settling of foundations, shifting of machine mounts, etc., take place and cause binding of the bearings with consequent malfunctioning of the machine. The accuracy of the leveling is also quite critical.

An object of the present invention is to overcome the above described difficulties, by devising a new and novel way of making a bearing unit, whether it be for a conventional slide type wherein the top, side and bottom portions of the sides of the slide engage bearing surfaces, or a slide type with the bearings widely dispersed.

A more specific object of the invention is to provide a novel bearing assembly wherein no surfaces are present on which dirt particles can collect by gravity.

Other objects and advantages of the invention will become apparent from a study of the following description taken with the accompanying drawing wherein:

FIG. 1 is an elevational view with parts of the cover shown broken away and embodying the present invention; and FIG. 2 is a side view thereof, partly in cross-section.

Referring more particularly to FIGS. 1 and 2 of the drawing showing a typical embodiment of our invention as applied to one of the four bearing corners of a large flash welder slide, slide member 12 is analogous to the conventional rectangular slide member previously mentioned. Mounted on the underside of the necked portion of slide rail member 12 is a wearplate 13 made of a material which is processed to withstand the heavy downward bearing load with an acceptable minimum amount of distortion. Slide member 12 and plate 13 are supported by, and roll on, the self-aligning ball, roller or needle antifriction bearing 14, which can also be of the plain, self-aligning, bushing type supported by bracket 15 which, in turn, is mounted on the stationary part of the machine, generally denoted by the numeral 16. The tire, or outer portion of the self-aligning bearing 14, pivots about its axis at surface 17 thus enabling the outer surface 18 of bearing 14 to keep itself aligned within limits at all times with its mating surface 19 of plate 13 regardless of machining or assembly inaccuracies.

Mounted on or supported in the necked down portion of the slide rail element 12 is a second self-aligning bearing 20 having the same characteristics as bearing 14. Bearing 20 takes the upward thrust of the slide member 12. A varying line on the periphery of bearing 20 is automatically kept in constant alignment with surface 21 of the underside of plate 22 which is rigidly mounted on the stationary portion 16 of the machine in general. Here again, normal inaccuracies of machining and assembly will not affect the intimate contact between the periphery of the roller and its mating face.

It should be especially noted here that by mounting roller 14 (which takes the downward thrust) on the stationary part of the machine and roller 20 (which takes the upward thrust) in or on the moving slide element, the surfaces that contact the periphery of the rollers point downwardly and are, therefore, protected from falling flash particles and other abrasive dirt particles since such particles cannot settle thereon.

To resist the lateral thrust of the sliding member 12 and to gudie it, we have mounted, on the slide member, a bracket 23 which carries a third self-aligning bearing 24 mounted so that its peripheral surface 25 is in a vertical plane and in intimate rolling contact with the vertical surface of wearplate 22. Here again it is apparent that the vertical surface of wearplate 22 does not have to be at an exact 90° angle to its wear surface 21 in order to maintain intimate contact. Furthermore, the vertical surface prevents falling flash and other abrasive dirt particles from sticking to it since they merely fall off therefrom. In short, the entire bearing assembly is devoid of any horizontal surface exposed to the dirt generating welder and on which dirt particles can collect by gravity.

It should be noted that bearing 24 resists lateral side thrust in only one direction. It is to be understood that a complementary bearing on the opposite side of the machine will resist the lateral thrust in the opposite direction. In the complementary bearings, the vertical roller supports 23 are also disposed outwardly of the sliding members 12.

Since the bearings of our resistance flash-butt welders are in a particularly dirty environment, we have taken further means of protecting the bearings to exclude the abrasives and other dirt particles. This protection is in the form of covers 26, 27 and 28, which, per se, do not form a part of this invention.

Furthermore, even though fine dust might creep through the protective covers, it will not have a tendency to stick to the downward and vertical wear surfaces of plates 13 and 22, especially since only rolling contact instead of sliding contact prevails at these surfaces. Roller bearing lubrication is confined to the inside of the self-aligning bearings and is not externally exposed to trap dirt. These bearings need only be infrequently lubricated.

Even though we show only one bearing assembly in detail, it should be understood that two or more of these units would be used to guide a sliding member, dependent upon machine construction. Four of these units can be used, one on each corner, of a large steel mill resistance flash-butt welder.

Roller bearing slides, whether they are of the fixed or self-equalizing types, are old in the art, per se, and commonly used. However, they are invariably arranged symmetrically, in pairs, so that at least one surface is a top horizontal one exposed to and capable of collecting, by gravity, dirt particles from the welder.

It should be noted that while the present invention is described in its application to a welder, it is equally useful in other machines that operate in a dirty, or dirt generating environment.

Thus it will be seen that we have provided a highly efficient roller bearing slide assembly which is especially useful in machines which generate dirt particles, such as welders, or in machines operating in a dirty environment, wherein none of the roller bearing slides includes a top surface, whether horizontal or not, exposed to the dirt generator, located above, and upon which surface the particles could collect by gravity to cause malfunction of the sliding or rolling bearing elements. Instead, all bearing surfaces are either vertical or are horizontal and on the underside of the machine so that dirt particles cannot collect thereon by gravity; furthermore, we have provided a unique bearing construction which is particularly suitable for strip flash welders and other dirt generating apparatus, which bearing construction eliminates alignment problems, reduces friction and prevents flash or dirt generated from contaminating the bearings.

While we have illustrated and described a single embodiment of our invention, it will be understood that this is by way of illustration only, and that various changes and modifications may be made within the contemplation of our invention and within the scope of the following claims.

We claim:

1. In a machine, a movable slide member having a downwardly pointing face, a roller bearing mounted on a stationary portion of said machine, the roller of said roller bearing contacting said face and arranged so that said roller bearing takes the downward thrust of said slide member, and a second roller bearing carried by said member above said first mentioned roller bearing, and a downwardly pointing face on a stationary portion of said machine arranged so that said second roller bearing takes the upward thrust of said slide member and whereby the said faces are rendered substantially particle free.

2. In a machine as recited in claim 1 wherein both of said roller bearings are self-aligning and wherein said downwardly pointing face of the slide member is horizontal relative to the machine and said second roller is vertically above said first mentioned roller and wherein said second roller bearing is carried on top of said slide member and wherein the cooperating downwardly pointing face of the stationary portion of the machine is horizontal.

3. In a machine as recited in claim 2 together with a third self-aligning roller bearing mounted on the side of said slide member and having its roller rotatable about a vertical axis and its periphery contacting the vertical side of a stationary portion of said machine to resist lateral thrust.

4. In a machine as recited in claim 3 wherein all of the surface contacting the peripheries of said three self-aligning rollers point downwardly to repel adherence of contaminating particles, and wherein said machine is devoid of any elongated anti-friction surfaces which point upwardly to engage a roller and on which contaminating particles may fall thereon by gravity and adhere thereto.

5. A machine as recited in claim 3 together with a shield for shielding all three of said roller bearings from outside contaminating particles.

References Cited

UNITED STATES PATENTS

| 486,299 | 11/1892 | Rowan | 308—6 |
| 2,045,464 | 6/1936 | Harley | 308—6 |
| 2,309,298 | 1/1943 | Bickel. | |
| 2,611,398 | 9/1952 | Schutz | 308—6 X |
| 2,711,352 | 6/1955 | Hasko et al. | 308—72 |
| 2,773,524 | 12/1956 | Schutz et al. | 308—6 X |

FOREIGN PATENTS 438,143  11/1935  Great Britain.

EDGAR W. GEOGHEGAN, *Primary Examiner.*

L. L. JOHNSON, *Assistant Examiner.*